United States Patent
Fix et al.

(10) Patent No.: US 9,465,465 B2
(45) Date of Patent: Oct. 11, 2016

(54) MULTILAYER BODY FORMING DISPLAY APPARATUS TOUCHPAD

(71) Applicants: Walter Fix, Furth (DE); Andreas Ullmann, Zirndorf (DE); Manfred Walter, Nuremberg (DE)

(72) Inventors: Walter Fix, Furth (DE); Andreas Ullmann, Zirndorf (DE); Manfred Walter, Nuremberg (DE)

(73) Assignee: PolyIC GmbH & CO. KG, Furth (DE)

( * ) Notice: Subject to any disclaimer, the term of this patent is extended or adjusted under 35 U.S.C. 154(b) by 94 days.

(21) Appl. No.: 14/366,408

(22) PCT Filed: Dec. 17, 2012

(86) PCT No.: PCT/EP2012/075805
§ 371 (c)(1),
(2) Date: Jun. 18, 2014

(87) PCT Pub. No.: WO2013/092496
PCT Pub. Date: Jun. 27, 2013

(65) Prior Publication Data
US 2014/0327848 A1 Nov. 6, 2014

(30) Foreign Application Priority Data
Dec. 22, 2011 (DE) .................. 10 2011 122 110

(51) Int. Cl.
G06F 3/041 (2006.01)
G06F 3/044 (2006.01)

(52) U.S. Cl.
CPC .............. G06F 3/041 (2013.01); G06F 3/044 (2013.01)

(58) Field of Classification Search
None
See application file for complete search history.

(56) References Cited

U.S. PATENT DOCUMENTS

| | | |
|---|---|---|
| 4,304,976 A | 12/1981 | Gottbreht et al. |
| 4,659,874 A | 4/1987 | Landmeier |
| 4,879,508 A | 11/1989 | Andermo |
| 5,034,740 A | 7/1991 | Acher |
| 6,054,872 A | 4/2000 | Fudanuki et al. |
| 6,222,522 B1 | 4/2001 | Mathews et al. |
| 8,633,915 B2 | 1/2014 | Hotelling et al. |
| 2004/0095335 A1 | 5/2004 | Oh |
| 2006/0097991 A1 | 5/2006 | Hotelling et al. |
| 2007/0242054 A1 | 10/2007 | Chang |
| 2008/0023888 A1 | 1/2008 | Brang et al. |
| 2008/0074298 A1 | 3/2008 | Krone |
| 2008/0074398 A1 | 3/2008 | Wright |

(Continued)

FOREIGN PATENT DOCUMENTS

| | | |
|---|---|---|
| CN | 101794187 A | 8/2010 |
| CN | 101833401 A | 9/2010 |

(Continued)

OTHER PUBLICATIONS

EPO decision to grant.
(Continued)

*Primary Examiner* — Seokyun Moon
*Assistant Examiner* — Douglas M Wilson
(74) *Attorney, Agent, or Firm* — William Squire (57) ABSTRACT

A touchpad apparatus extends, without having to be covered by a cover, up to an outer housing edge of an operating device. In two possible cases, not only touchpads and connections between the touchpads in the touchpad area are formed by patterns of conductive strips which cannot be resolved by the human eye, but also contact connection lines which connect contact elements to each other at two sides of the touchpad area.

10 Claims, 7 Drawing Sheets

(56) References Cited

U.S. PATENT DOCUMENTS

| | | |
|---|---|---|
| 2009/0073135 A1 | 3/2009 | Lin et al. |
| 2009/0284492 A1 | 11/2009 | Chino |
| 2010/0028811 A1* | 2/2010 | Geaghan ............... G06F 3/044 430/319 |
| 2010/0302201 A1 | 12/2010 | Ritter et al. |
| 2011/0012845 A1 | 1/2011 | Rothkopf et al. |
| 2011/0022351 A1 | 1/2011 | Philipp et al. |
| 2011/0074609 A1 | 3/2011 | Lin |
| 2011/0102370 A1 | 5/2011 | Kono et al. |
| 2011/0193800 A1 | 8/2011 | Son et al. |
| 2011/0199333 A1 | 8/2011 | Philipp et al. |
| 2012/0032914 A1 | 2/2012 | Kim |
| 2012/0056664 A1 | 3/2012 | Nam |
| 2012/0098784 A1 | 4/2012 | Kim |
| 2012/0193130 A1 | 8/2012 | Fix et al. |
| 2012/0227259 A1* | 9/2012 | Badaye ................ G06F 3/044 29/846 |
| 2012/0273336 A1 | 11/2012 | Kuriki |
| 2012/0327016 A1 | 12/2012 | Hristov |
| 2013/0154995 A1* | 6/2013 | Trend .................. G06F 3/044 345/174 |
| 2014/0166464 A1 | 6/2014 | Fix et al. |
| 2014/0202840 A1 | 7/2014 | Fix et al. |

FOREIGN PATENT DOCUMENTS

| | | |
|---|---|---|
| DE | 2910451 A1 | 9/1979 |
| DE | 30 04461 A1 | 8/1981 |
| DE | 3149722 A1 | 9/1982 |
| DE | 102006043665 A1 | 5/2006 |
| DE | 202006010488 U1 | 12/2006 |
| DE | 102005041114 A1 | 3/2007 |
| DE | 20 2006 018448 | 4/2007 |
| DE | 202007007345 | 12/2007 |
| DE | 102008050216 | 5/2009 |
| DE | 112008001245 T5 | 3/2010 |
| DE | 20 2009 017952 U1 | 10/2010 |
| DE | 102009044110 A1 | 4/2011 |
| EP | 2045698 A2 | 4/2009 |
| EP | 2065794 A1 | 6/2009 |
| EP | 2045698 A2 | 8/2009 |
| EP | 2405328 A2 | 1/2012 |
| GB | 2026745 A | 2/1980 |
| GB | 2090979 A | 7/1982 |
| GB | 8812393.6 U1 | 12/1988 |
| GB | 24828306 A | 1/2007 |
| GB | 2437827 A | 11/2007 |
| GB | 2439614 A | 1/2008 |
| WO | WO03/049019 A2 | 6/2003 |
| WO | WO2004/112448 A2 | 12/2004 |
| WO | WO2005/045659 A1 | 5/2005 |
| WO | WO2005/114369 A2 | 12/2005 |
| WO | WO2005/045659 A1 | 5/2006 |
| WO | WO2009/134727 A1 | 11/2009 |
| WO | WO2010/046650 | 4/2010 |
| WO | WO2010/101399 A2 | 9/2010 |
| WO | WO2010/108692 A2 | 9/2010 |
| WO | WO2012/115685 A1 | 8/2012 |

OTHER PUBLICATIONS

EPO International Search Report May 7, 2013 cited in PCTapplication corresponding to instant subject applicatoin with written opinion.

Two International Search reports PCT/EP2012/061933 & PCT/EP2012/061930 both PCT applic. filed Jun. 21, 2012.

Examination report in corresponding and related German applications.

* cited by examiner

MULTILAYER BODY FORMING DISPLAY APPARATUS TOUCHPAD

The invention relates to an operating device having a display apparatus which provides a display field, and having a touchpad apparatus which is arranged on the display field and comprises touchpads. Areas on the display field that are placed underneath the touchpads of the touchpad apparatus correspond to these touchpads. In a manner known per se, an input in respect of a representation provided on the area of the display field lying underneath or information contained in the representation can be carried out by touching a touchpad.

The invention also relates to a multi-layer body for providing a touchpad functionality. The aim in the case of touchpad apparatuses is that these are as transparent as possible, in order that the representation provided underneath is as visible as possible on the display field. For this purpose, the multi-layer body has a carrier, on which, in one layer, strip conductors (thus electrically conductive strips) are arranged which have a width from the range of from 1 μm to 40 μm, preferably from the range of from 5 μm to 25 μm. The strip conductors are arranged in patterns such that touchpads and connections are delimited by these patterns. Of these touchpads, touchpads of a first class serve as touchpads that couple out, e.g. emit an electromagnetic field. The touchpads of a second class are galvanically separated from the touchpads of the first class and serve as touchpads that couple in, receive the electromagnetic field in the example case. For both classes, in each case a plurality of touchpads of the respective class are galvanically coupled via connections (thus strip conductors). At least some of these connections lead to contact elements outside of an area of surface which is occupied by the touchpads at a first edge side of same. Now, it may be the case that the touchpads also have to be galvanically coupled to a contact element at a second edge side, in particular opposite the first edge side, (for instance if some others of the connections lead to this second edge side). In order that an excessively large number of connections do not pass through the area of surface, the connections (e.g. in one half of the touchpad area) are guided onto the edge side having the contact elements, but at least some of the contact elements are then coupled to contact elements at the second edge side, in particular opposite the first edge side, via contact connection lines. Until now, such contact connection lines have been guided outside of the area of surface having the touchpads. For example, the area of surface is rectangular, and the first and second edge sides are the shorter sides of the rectangle, and the contact connection lines then lead along the third and fourth edge sides, on the respectively longer edge sides.

A problem now exists that such contact connection lines are not transparent. In order that these are not visible, they are covered from above, thus a screening cover is provided on the touchpad apparatus where the contact connection lines run.

Such a screening cover is also provided when, instead of the named multi-layer body, another type of touchpad apparatus is used, because in all known types of touchpad apparatuses contact connection lines run along two sides of the touchpad apparatus.

An object of the invention is to identify a way of being able to improve an operating device having a display apparatus and a touchpad apparatus.

The object is achieved in one aspect by an operating device with the features according to claim 1 and in another aspect by a multi-layer body with the features according to claim 13.

The operating device according to the invention thus comprises a display apparatus which provides a display field, and a touchpad apparatus which is arranged on the display field and comprises touchpads, wherein areas on the display field that are placed underneath the touchpads of the touchpad apparatus correspond to these touchpads, and furthermore the operating device comprises a housing which has at least one outer edge, wherein the display field at a respective outer edge of same is only limited by the outer edge.

In the invention, therefore, the display field of the display apparatus occupies a space that leads up to the edge, with the result that the display field in the area of the edge is not covered by a cover. The operating device is therefore aesthetically pleasing and particularly easy to operate.

As also provided in the multi-layer body, the touchpad apparatus is to be transparent overall, in particular to have a degree of transparency of at least 50%, preferably of at least 80%, particularly preferably of at least 90% and quite particularly of at least 95%. This is made possible in the invention in that the strip conductors are used which have a width from the range of from 1 μm to 40 μm, preferably from 5 μm to 25 μm, and these strip conductors provide the touchpads and the at least one contact connection line in a pattern, with the result that the touchpads are not recognizable with the naked eye. The strip conductors only reduce the degree of transparency a little, but as they occupy at least half of the surface, preferably a much smaller proportion, the degree of transparency is determined by the amount of surface covered by strip conductors, and corresponds to the proportion of the surface not occupied by the strip conductors relative to the total surface.

The strip conductors of all touchpads here are preferably also provided in a single layer of a multi-layer body of the touchpad apparatus. The touchpad apparatus can be constructed particularly compact using this technology.

In a preferred embodiment of the operating device, the touchpad apparatus which corresponds to the display field on the respective edge side which borders the outer edge is transparent with a degree of transparency of at least 50%, preferably of at least 80%, particularly preferably of at least 90% and quite particularly preferably of at least 95%. In two possible alternatives to this, in particular the technology of the very narrow strip conductors that cannot be resolved by the eye can be drawn on.

In the first alternative which makes the invention possible, the display field comprises, at least at one edge side, an area for a representation on which an edge area of the touchpad apparatus is arranged which is touchpad-free and is transparent, in particular has a degree of transparency of at least 50%, preferably of at least 80%, particularly preferably of at least 90% and quite particularly preferably of at least 95%. In this alternative, a representation can be provided on the display field also at the at least one edge side, only with the limitation that no touchpad can be assigned to this representation, with the result that no selection possibility for providing an input can be provided by the representation. In particular at the left- and right-hand edges of a representation, however, such properties are not necessary at all. In contrast, a representation with a particularly large surface area is made possible on the display field, and thus a particularly good recognizability and thus operability by an operator.

In a preferred embodiment of the first alternative, the touchpads together occupy a touchpad surface which is delimited by a contour curve, and the edge area extends at least at one point up to a distance of at least 0.1 mm, preferably at least 0.3 mm, particularly preferably at least 0.5 mm from the contour curve. In this edge area, there is then sufficient space for contact connection lines. This is true in particular when the touchpad surface has the shape of a rectangle and the edge area occupies a strip along one side of the rectangle, preferably along a longer side of the rectangle (in the case of a rectangle differing from a square).

Such a contact connection line (at least one) is therefore also preferably guided in the edge area of the touchpad apparatus. As already stated, it is provided according to the invention that this at least one contact connection line is provided by a plurality of strip conductors, in a pattern, which have a width from the range of from 1 μm to 40 μm, preferably from the range of from 5 μm to 25 μm.

The second alternative which makes it possible for the display field to run up to the outer edge of the housing of the operating device includes the touchpad apparatus actually running up to this outer edge by simply running at least one contact connection line, which runs from a first edge area of the touchpad apparatus to a second edge area of the touchpad apparatus, through between touchpads or (galvanically separated from it) through at least one touchpad, with the result that at least a third edge area of the touchpad apparatus is free from contact connection lines, in particular in the case of a rectangle preferably also a fourth edge area of the touchpad apparatus is free from contact connection lines.

If the edge is free from contact connection lines, naturally the touchpad apparatus can have touchpads right up to the edge. Here too, there is then no need for a screening cover in order to cover contact connection lines at the edge (at the third and fourth edge areas).

In order that the contact connection lines are not visible, as stated above, it is provided according to the invention that these are likewise provided by strip conductors (in a pattern) which have a width from the range of from 1 μm to 40 μm and preferably from 5 μm to 25 μm.

In both alternatives, the touchpads are preferably assignable to two groups, wherein the touchpads of the first group serve as touchpads that couple out, in particular emit an electromagnetic field, and the touchpads of the second group serve as touchpads that couple in, in particular receive an electromagnetic field, and the touchpads of the first group are galvanically separated from the touchpads of the second group, wherein a plurality of touchpads of the first group are galvanically coupled and a plurality of touchpads of the second group are galvanically coupled. The touch is thus preferably detected capacitively.

Here, two preferred variants are suggested for the design of the touchpads.

In a first variant, the touchpads comprise comb-shaped forms, wherein fingers on the touchpads of the first group and fingers on the touchpads of the second group interlock, wherein the touchpads of one of the groups have a meandering base, from which fingers protrude alternating (in groups) in one direction and in the other direction.

In this first variant, the second embodiment of the invention can be realized in that the meandering base is separated into two parts by a gap, wherein a contact connection line runs through the gap.

In the second variant for the design of the touchpads, the touchpads of a first group have the shape of quadrangles overlapping at one corner and the touchpads of a second group have a triangular shape with a right angle which engages between the quadrangles.

In this second variant, to realize the second embodiment of the operating device according to the invention the overlapping quadrangles are separated into two parts by a gap, wherein a contact connection line runs through the gap.

The multi-layer body according to the invention has a carrier, on which strip conductors are arranged, in a first layer, which have a width from the range of from 1 μm to 40 μm and preferably from 5 μm to 25 μm, wherein the strip conductors are arranged in patterns such that touchpads and connections are delimited by the patterns, of which touchpads of a first class serve as touchpads that couple out, in particular emit an electromagnetic field, and of which touchpads of a second class are galvanically separated from the touchpads of the first class and serve as touchpads that couple in, in particular receive an electromagnetic field, and wherein furthermore for both classes a plurality of touchpads of the respective class are galvanically coupled via connections. The connections lead to at least one contact element outside of an area of surface having the touchpads at a first edge side, and at least some of the contact elements (thus at least one contact element) are coupled to a respective contact element at a second edge side, in particular opposite the first edge side, via contact connection lines. According to the invention, it is provided in particular that the contact connection lines are likewise provided by strip conductors, in a pattern, which have a width from the range of from 1 μm to 40 μm, preferably from 5 μm to 25 μm.

The contact connection lines thus become impossible for the human eye to resolve, with the result that a shielding by a screening cover is not needed anywhere.

This is also true in particular when at least some of the contact connection lines are guided along a third edge side outside of the area of surface having the touchpads; in this case, according to the preferred alternative for the operating device according to claim 1, on a display field arranged underneath the multi-layer body there can be a representation which is independent of the touchpad functionality of the multi-layer body.

The contact connection lines guided along a third edge side preferably have a width from the range of between 150 μm and 400 μm and a distance from each other from the range of between 1 μm and 50 μm, further preferably of between 5 μm and 30 μm, particularly preferably of between 10 μm and 20 μm.

Alternatively or in addition to this embodiment, in which contact connection lines are guided along a third edge side, it can be provided that at least some of the contact connection lines pass through the area of surface having the touchpads.

This can be realized in particular in that at least one touchpad is divided into two parts which are separated by a gap, and in that the gap is passed through by strip conductors which provide the contact connection lines.

In particular if a first distance between the contact connection line passing through the gap and one of the two parts of the touchpad, or at best both parts of the touchpad, is smaller than a second distance which is given between touchpads of the first class and touchpads of the second class, interfering signals are kept particularly low. A large second distance guarantees that the electrical field lines that are important for the touch sensitivity extend far into the space above the touchpads and thus allow a touching object to be detected. In contrast, in the case of a small first distance the associated field lines, the influencing of which would lead to an interfering signal, only reach into the space very little, with the result that they are not, or are only very slightly, influenced by a touching object. The first distance preferably lies between 1 µm and 40 µm, further preferably between 5 µm and 30 µm, particularly preferably between 10 µm and 20 µm. The second distance preferably lies between 100 µm and 500 µm, further preferably between 200 µm and 300 µm. Here too, the width of the contact connection lines is preferably between 100 µm and 1 mm, further preferably between 150 µm and 400 µm.

In a first variant, the touchpads here again comprise comb-shaped forms, wherein fingers on the touchpads of the first group and fingers on the touchpads of the second group interlock, and wherein the touchpads of one group have a meandering base, from which fingers protrude alternating (in groups) in one direction and in the other direction, wherein it is then the meandering base that is separated into two parts by a gap through which the contact connection line runs or the strip conductors that provide this run.

In a second variant, the touchpads of a first group have the shape of quadrangles overlapping at one corner and the touchpads of a second group have a triangular shape with a right angle, wherein the corner with the right angle engages between the quadrangles, and wherein it is then the quadrangles overlapping each other that are separated into two parts by a gap (whereby triangles overlapping each other are formed), and wherein then the contact connection line runs or the strip conductors providing the contact connection line run through this gap.

In the multi-layer body according to the invention in all variants, the strip conductors preferably have a thickness of between 3 nm and 5 µm, particularly preferably of between 40 nm and 1 µm.

The material for the strip conductors can be silver, copper, gold, aluminum, chromium, a mixture or alloy of at least two of the previously named materials, a conductive paste, or the material can comprise another conductive substance, for example an organic compound with mobile charge carriers such as polyaniline, polythiophene and others.

Preferred embodiments of the invention are described in more detail below with reference to the drawing, in which.

A touchpad apparatus is to be used, in an example case, in a mobile telephone, together with a display apparatus. Here, the touchpad apparatus is provided above a display field of a display apparatus.

Figure 1:
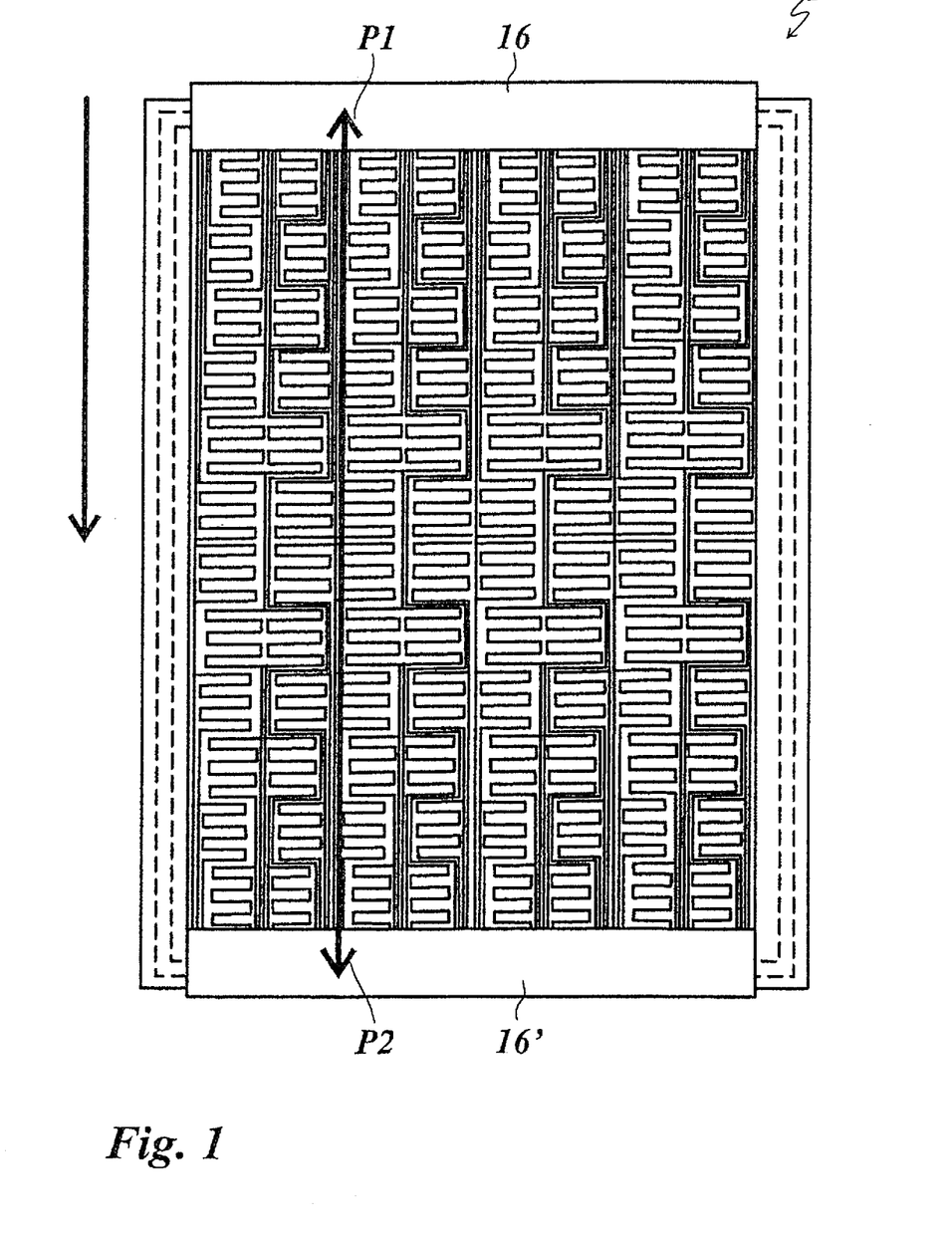
FIG. 1 shows a top view of a multi-layer body according to a first aspect of the invention.

The touchpad apparatus in the present case is provided by a multi-layer body which is shown in top view in FIG. 1.

Figure 2:
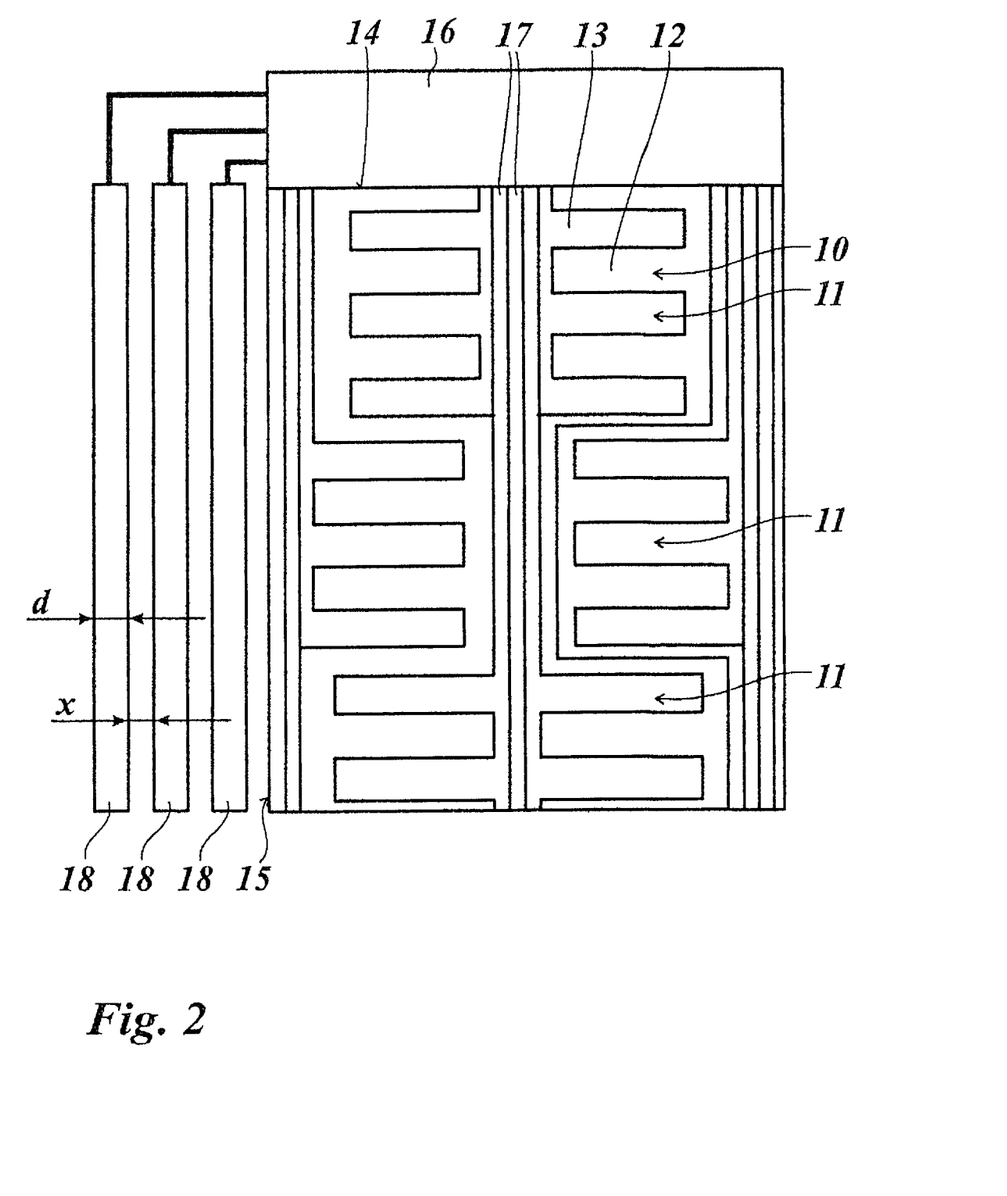
FIG. 2 shows an enlarged section of the upper left-hand corner, shown in FIG. 1, of the multi-layer body from FIG. 1, FIGS. 3a to 3d show different possible pattern structures for strip conductors

As can be seen in particular in the enlargement according to FIG. 2, the touchpad apparatus 1 comprises a plurality of touchpads 10 of a first class and 11 of a second class. The touchpads 10 are provided by a substantially meandering base from which fingers 12 protrude which engage in corresponding fingers 13 of the touchpads 22 of the second class. The touchpads 10 emit electromagnetic radiation or couple out an electric field capacitively, and the touchpads 11 receive the electromagnetic radiation or couple in the electric field. For this, the touchpads 10 of the first class are electrically separated from the touchpads 11 of the second class.

The touchpads 10, 11 in total occupy a touchpad surface which is rectangular in the present case, see the upper side 14 of the rectangle and the left-hand side 15 of the rectangle in FIG. 2.

Touchpads of one class are galvanically coupled to each other, for which contact elements (or also outer elements), the precise design of which is not of interest in the present case, are provided in an area 16. In the present case, it suffices to know that the touchpads 10 are galvanically coupled to each other by being connected individually or in groups to a common contact element which thus contacts these touchpads.

As the touchpads 10, 11 are to fill the rectangular touchpad area as closely as possible, connection lines 17 are guided from the upper half, according to the arrow P1, upwards to the contact elements in the area 16 and from the lower half, according to the arrow P2, downwards to corresponding contact elements in the area 16'.

The contact elements from the area 16 are now to be galvanically coupled in each case to a contact element from the area 16'. This takes place via contact connection lines 18 beyond the rectangular touchpad area, i.e. at an edge side of the touchpad apparatus 1. As is easily recognizable in FIG. 2, in the present case three such contact connection lines 18 are provided which run parallel to the longer side 15 of the rectangle.

Figure 3A:
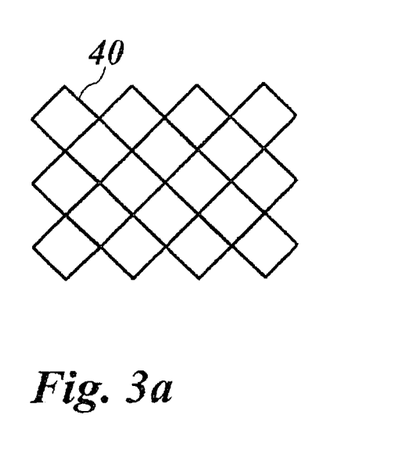
Figure 3B:
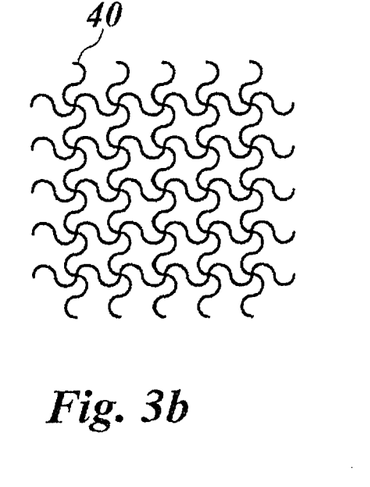
Figure 3C:
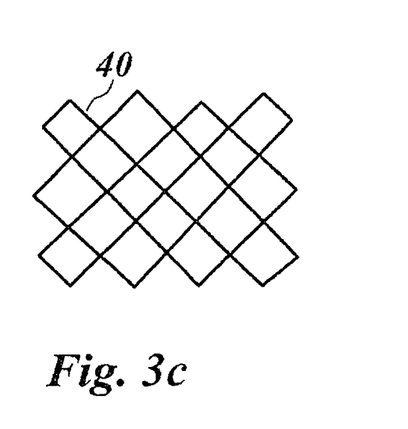
Figure 3D:
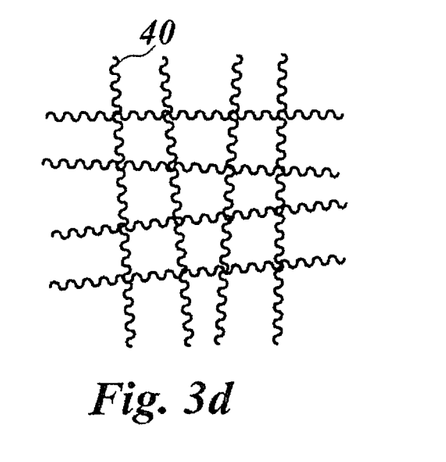

Ideally a touchpad apparatus is not to be seen by an observer. For this reason, in the present case the touchpads are delimited by strip conductors 40 which are microscopically small, with the result that they cannot be resolved individually by the human eye. The strip conductors 40 have in particular a thickness from the range of from 1 µm to 40 µm, preferably from the range of from 5 µm to 25 µm. The width d of the contact connection lines 18 is preferably between 100 µm and 1 mm, particularly preferably between 150 µm and 400 µm. A particularly homogeneous optical impression then results. The distance x between the contact connection lines 18 is only between 1 µm and 50 µm, preferably between 5 µm and 30 µm, particularly preferably between 10 µm and 20 µm. The small spacing x compared with the width d creates a homogeneous optical impression and the contact connection lines 18 are not apparent for the human observer. The patterns can, as shown in FIG. 3a and FIG. 3b, be regular, to prevent diffraction and moiré effects they are arranged, as far as possible, not parallel to each other (FIGS. 3c and 3d) and have further a plurality of crossover points in order thus to provide as uniform as possible a surface conductivity.

The electrically conductive strips 40 are applied in particular to a carrier substrate 30 which preferably consists of a flexible plastic film, for example of polyethylene (PE), polypropylene (PP), polyvinyl chloride (PVC), polystyrene (PS), polyester (PE) and/or polycarbonate (PC). The flexible plastic film preferably has layer thicknesses of between 15 µm and 300 µm, preferably of between 23 and 100 µm. The carrier substrate is formed transparent.

An electrically conductive layer 31 (FIG. 3e) provides the strip conductors 40 and in the present case preferably consists of a metal, for example copper, aluminum, chromium, silver or gold. This metal layer is preferably applied to the carrier substrate 30 in a layer thickness of between 20 nm and 100 nm and structured. The application can take place by means of vapor deposition, sputter deposition and any other application process. The structuring preferably takes place here by means of an etching (positive or negative etching) process or by means of a washing process. Similarly, a printing process can also be used for the structuring. The application and structuring can also take place in one step, e.g. if an application mask is used.

Figure 3E:
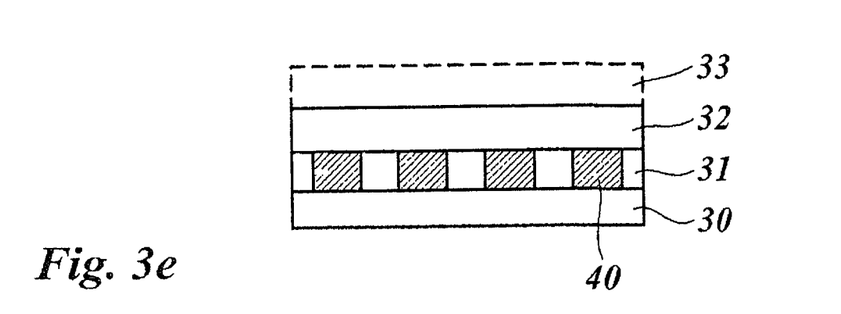
FIG. 3e shows a layer structure, by which strip conductors according to FIGS. 3a to 3d can be provided.

Between the carrier substrate 30 and the electrically conductive layer 31, an adhesion-promoting layer can also be arranged which improves the adhesion of the electrically conductive layer 31 to the carrier substrate 30. Such an adhesion-promoting layer is preferably likewise formed from a transparent material.

A dielectric layer 32 is furthermore applied to the first electrically conductive layer 31. The dielectric layer 32 is preferably a transparent varnish which is applied to the electrically conductive layer 31 by means of a printing process in a layer thickness of from 1 µm to 40 µm. It is advantageous here if, in areas, no material is applied already when the dielectric layer 32 is applied, in order that vias not shown in FIG. 3e can be provided later. Optionally, yet another electrically conductive layer 33 can be applied to the dielectric layer 32. This can then be provided for the provision of contact fields or the like. It can be applied by means of printing of an electrically conductive printing substance, for example carbon black or conductive silver. The named recesses of the dielectric layer 32 can then be filled with the printing substance, thus vias can be filled at the same time.

In the present case not only are the touchpads 10, 11 and connections 17 in the rectangular touchpad area now to be provided by the strip conductors 40, but the provision of strip conductors 40 in the same electrically conductive layer 31 also outside of the rectangular touchpad area is to have the effect that the contact connection lines 18 are likewise delimited by strip conductors 40.

Figure 4:
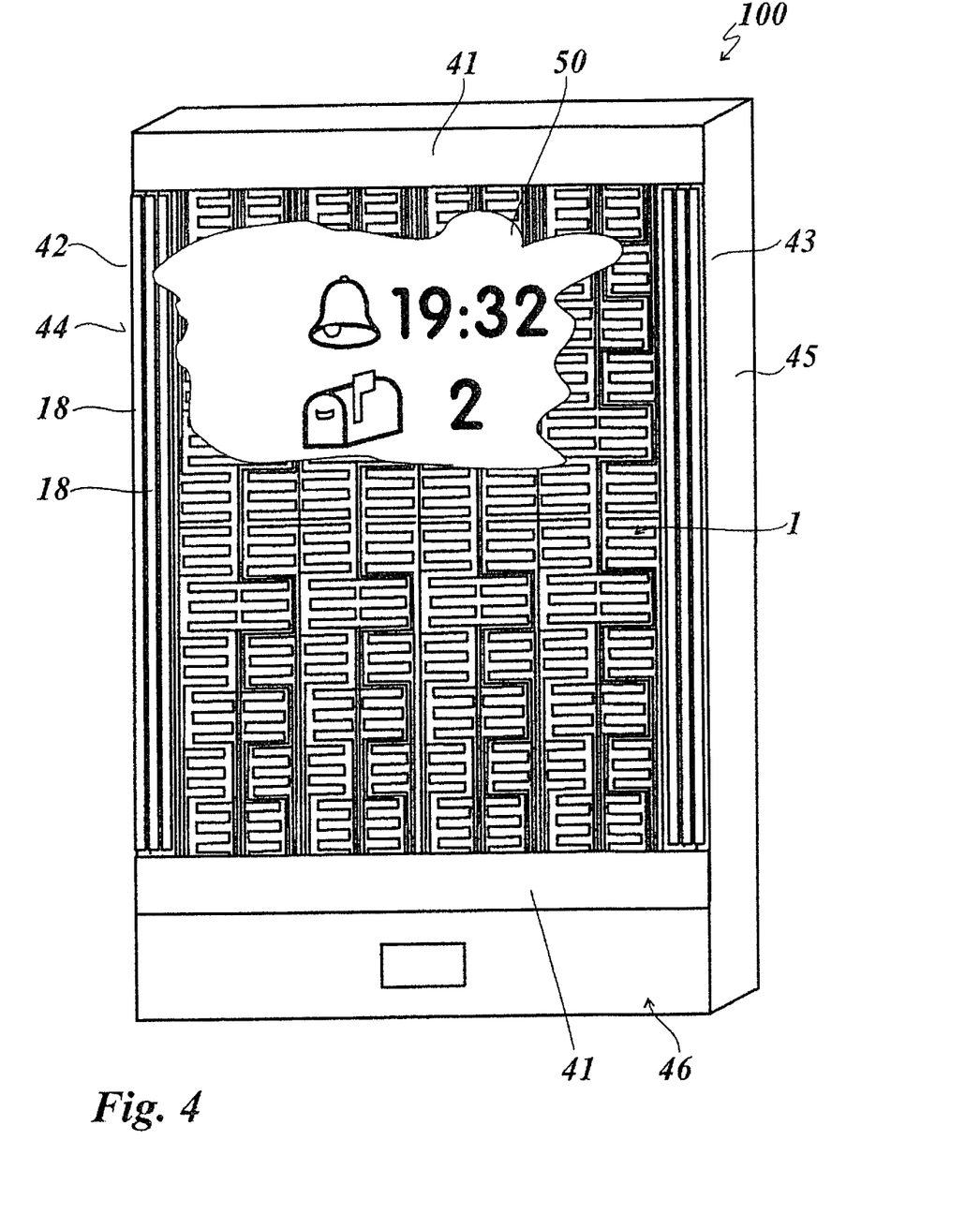
FIG. 4 shows a mobile telephone as an operating device in which the multi-layer body from FIG. 1 is used.

The contact connection lines 18 thus likewise cannot be resolved by the human eye. However, it thus becomes possible to implement the measure shown in FIG. 4:

In a mobile telephone 100, although the contact elements of the areas 16 and 16' are concealed by a cover 41 because they are not transparent, the contact connection lines 18 are not concealed. Instead, the touchpad apparatus 1 extends over the whole width of the mobile telephone 100 and thus up to the front left-hand edge 42 or up to the front right-hand edge 43. The edges 42 and 43 in the present case are represented as sharp, angular edges, but can also be rounded. Underneath the touchpad apparatus 1 and also the contact connection lines 18, a display 50 is provided: Although the touchpads 10, 11 are used to operate the mobile telephone 100, a representation can also still extend outside of the touchpad area, namely in particular through a display field, extending to below the contact connection lines 18, which thus borders the side walls 44 and 45 of a housing 46 of the mobile telephone 100.

Although the representation underneath the contact connection lines 18 cannot involve an input, precisely in this edge area it is not strictly necessary for there to be corresponding representations here which make an input instruction possible.

In a second aspect of the invention, contact connection lines, depending on the type of the contact connection lines 18, are not guided laterally along the edge of the touchpad area, but through the touchpad area. In this way, a touchpad area can extend over a complete display field without the need to provide a screening cover or the like at the edge.

Figure 5:
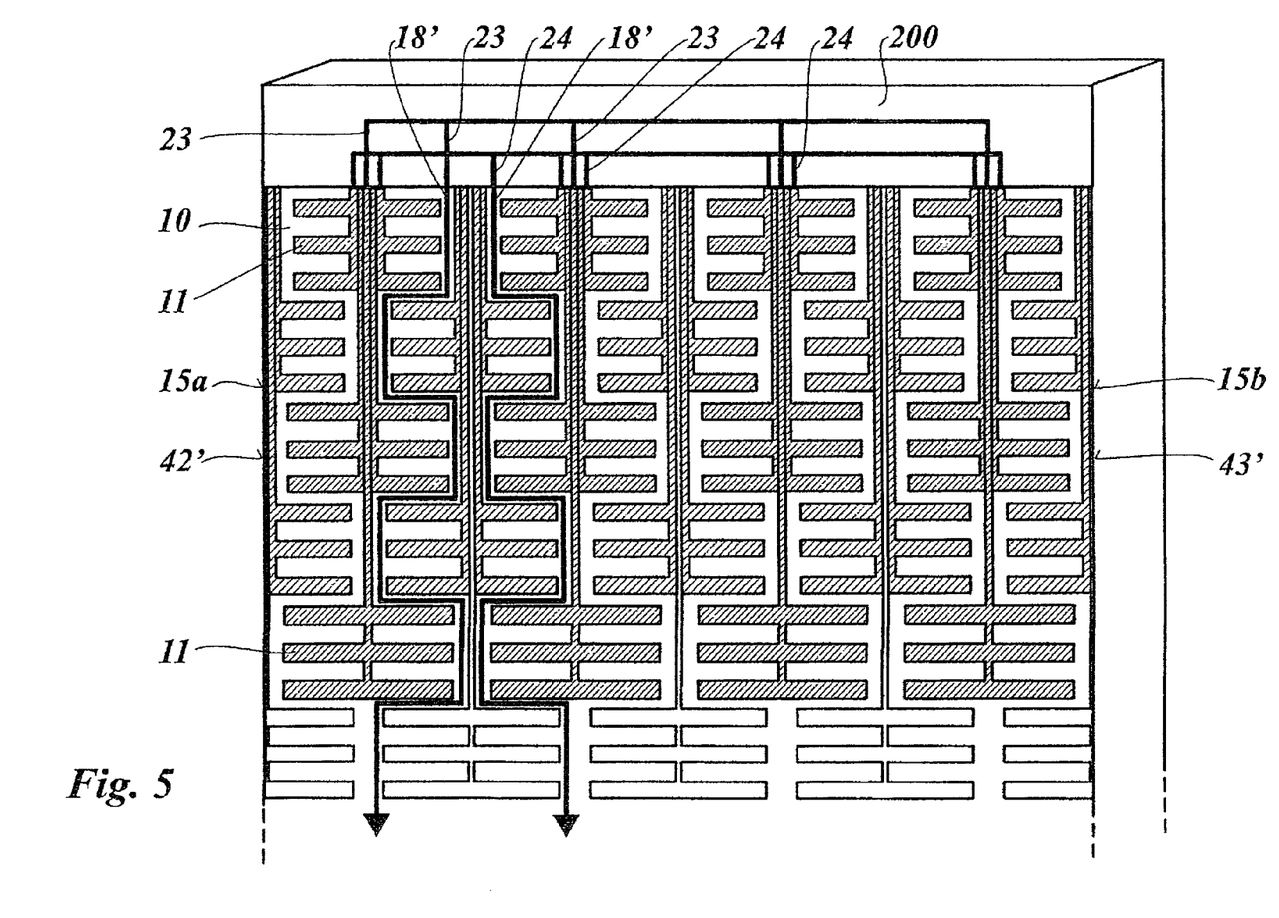
FIG. 5 shows a top view of a multi-layer body according to a first variant of a second aspect of the invention.
Figure 6:
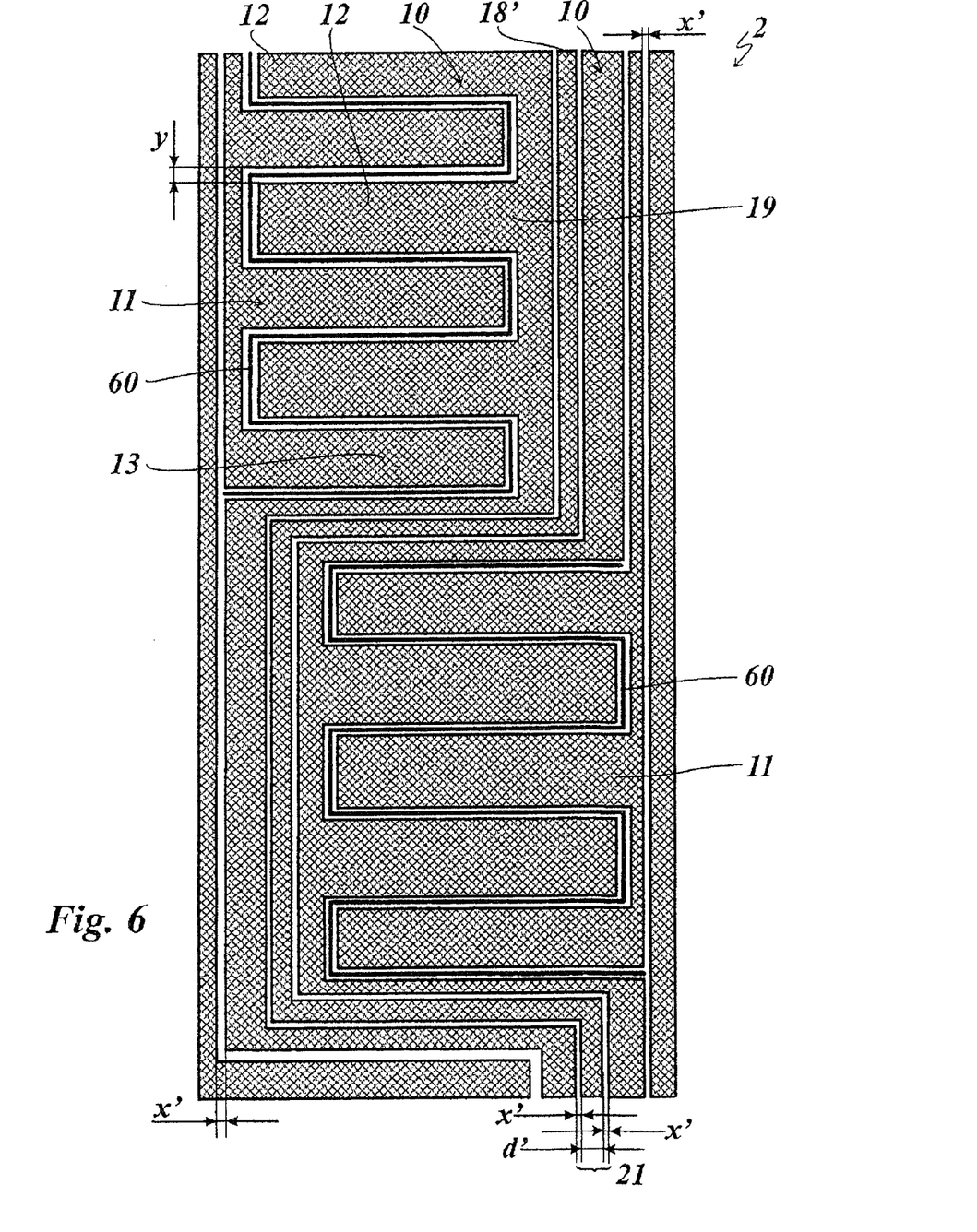
FIG. 6 shows an enlarged section of the multi-layer body from FIG. 5

The variant according to FIGS. 5 and 6 substantially corresponds to that according to FIG. 1, thus here again the touchpads 10 of the first class and the touchpads 11 of the second class are provided. As can be recognized in detail in FIG. 6, there is a base 19 which runs in a meandering way and from which the fingers 12 protrude.

In the present case, the base 19 (FIG. 6) is divided into two parts which are separated from each other by a gap 21, and a contact connection line 18' then runs through this gap 21. The contact connection line 18' thus likewise runs in a meandering way, but no fingers 12 protrude from it.

The contact connection lines 18' in the present case are, just like the touchpads 10 and 11, provided by strip conductors 40 depending on the type of the strip conductors defined above with reference to FIGS. 3a to 3e. The transparent effect of the touchpad apparatus is thus not impaired by the fact that the contact connection lines 18' are guided through the center of the touchpad surface.

The inventors of the touchpad apparatus recognizable with the aid of FIGS. 5 and 6 are aware that the contact connection lines 18' ensure an only insignificant disruptive coupling, with the result that they can run through the center of the touchpads 10.

This is the case in particular when the distance x' between the contact connection line 18' and the touchpad 10 is chosen smaller than the distance y between the touchpad 10 and the touchpad 11. In this way, interfering signals are kept particularly low, in fact the smaller the ratio of x' to y is, the lower they are. A large distance y guarantees that the electrical field lines that are important for the touch sensitivity extend far into the space above the electrically conductive layer 31 and thus allow a touching object to be detected. In contrast, in the case of a small distance x' the associated field lines, the influencing of which would lead to an interfering signal, only reach into the space very little, with the result that they are not, or are only very slightly, influenced by a touching object. The distance y between the touchpads 10 and 11 preferably lies in the range 100 µm and 500 µm, particularly preferably between 200 µm and 300 µm. In contrast, the distance x' preferably lies between 1 µm and 50 µm, preferably between 5 µm and 30 µm, particularly preferably between 10 µm and 20 µm. The width d' of the contact connection line 18' is preferably between 100 µm and 1 mm, particularly preferably between 150 µm and 400 µm. The same also applies to the distances x' and y between a contact connection line 73 and a touchpad 70 or between the touchpad 70 and a touchpad 71 of FIG. 7.

In order to create as homogeneous as possible an optical impression for an observer and to guarantee the non-visibility of the functional surfaces constructed of the strip conductors, a blind grid 60 which is spaced apart from the touchpad 10 and the touchpad 11 in each case by the distance x' is additionally provided between the touchpads 10 and 11 at those points at which they are opposite each other with the distance y. The blind grids 60 are formed from the same material as the strip conductors and have the same pattern as the contact connection line 18', the touchpads 10 and 11 as well as their supply lines, but do not assume the function of an electrical line, rather they serve to make the individual areas of surface non-recognizable or non-distinguishable.

FIG. 5 shows, by the dotted line, how a mobile telephone 200 could look here: If the whole touchpad surface is viewed as a rectangle, at the top in or through contact fields 23 a first set of touchpads 11 of the second class are galvanically coupled to each other (contacted), in contact fields 24 a second set of touchpads of the second class are galvanically coupled to each other (contacted), and these contact fields 23, 24 pass directly into the respective contact connection lines 18'. The contact fields 23 and 24 (which can also be called outer fields or elements) are now covered by a cover, but the whole touchpad area is visible and delimited by the contour of the mobile telephone 200, wherein at the same time the side edge 42' of the mobile telephone 200 is provided by the left-hand side 15a of the rectangle, at the same time the side edge 43' of the mobile telephone is provided by the right-hand side 15b of the rectangle.

Figure 7:
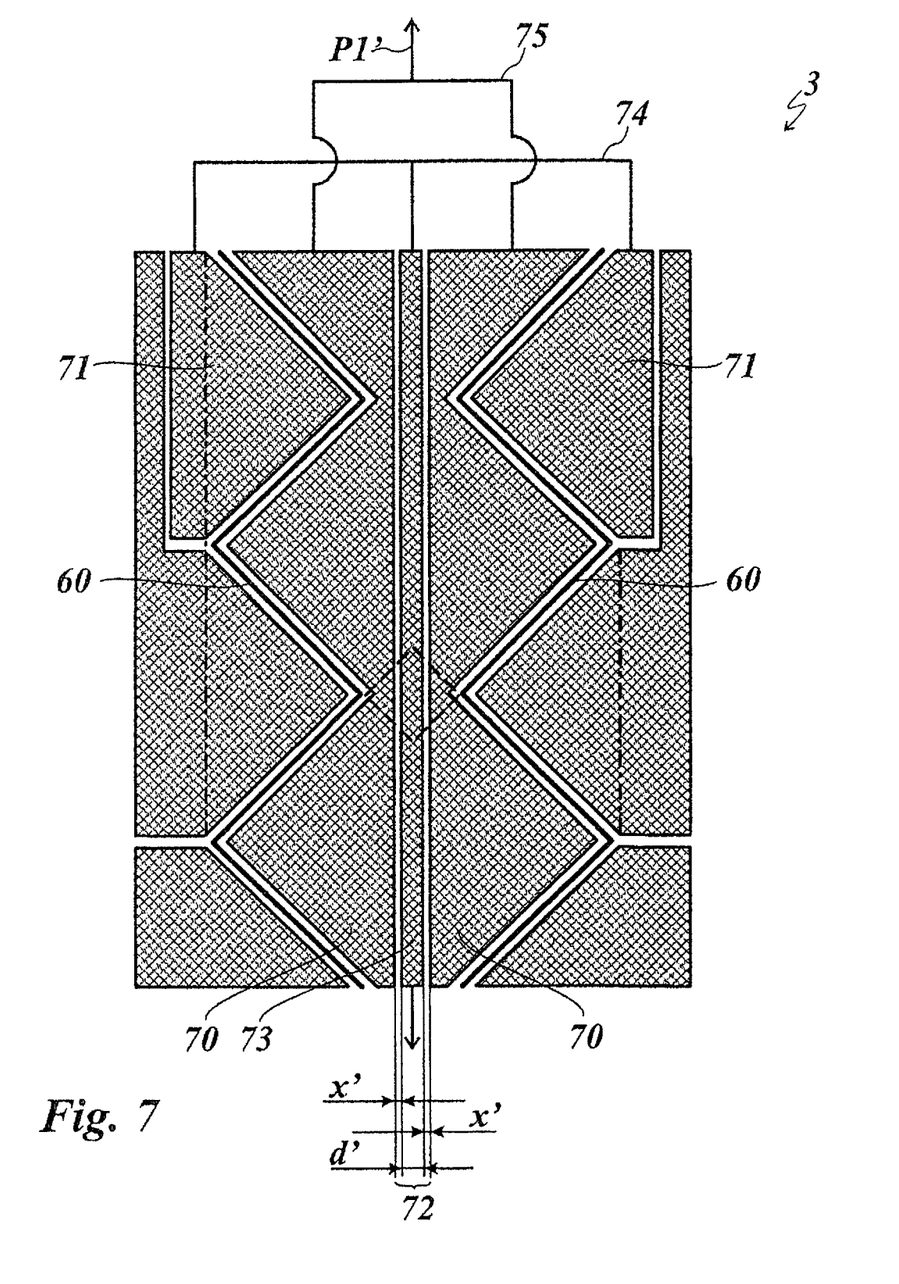
FIG. 7 shows a top view of a multi-layer body according to a second variant of the second aspect of the invention.

In both aspects, the invention is not limited to the use of the touchpads with a meandering base and fingers protruding therefrom which engage in the fingers of other touchpads. This applies to both aspects of the invention. FIG. 7 now shows a further embodiment for the second aspect of the invention:

Here, touchpads 70 of the first class are provided which are formed by a sequence of overlapping rectangles (see the overlapping areas indicated by dotted lines). The touchpads of the second class 71 have geometric shapes which comprise a right-angled isosceles triangle, see the dot-dashed lines. These isosceles triangles with right angles reach precisely between the squares of the associated touchpad apparatus 70 of the first class.

In the touchpad 70, a gap 72 is now provided through which the contact connection line 73 runs. The gap 72 is rectilinear, and thus the contact connection line 73 is also rectilinear. In the present case, the upper part of FIG. 7 shows that two touchpads 71 of the second class are galvanically coupled to each other (contacted) via contact elements 74, and from the contact elements 74 the contact connection line 73 now extends to the opposite side. In contrast, the two halves of the touchpad 70 are coupled to each other via contact elements 75 which are connected towards the upper side, which is illustrated by the arrow P1'. The provision of the contact elements 74, 75 (which can also be called outer elements) is not essential in the present case. It is important that the contact connection lines 73, just like the touchpads 70 and 71, are also provided by electrically conductive strips 40 in a pattern here, as was explained above with reference to FIGS. 3a to 3e.

The invention claimed is:

1. Multi-layer body comprising:
   a carrier having a surface on which a plurality of strip conductors and associated connections are arranged, in one layer, which have a width in the range of from 1 μm to 40 μm, wherein the strip conductors and their associated connections are arranged in patterns coupled to a plurality of touch pads on the surface such that the touchpads and certain of the connections are delimited by the patterns, of which touchpads of a first class serve as touchpads that couple out by emitting an electromagnetic field, and of which touchpads of a second class are electrically separated from the touchpads of the first class and serve to couple in by receiving an electromagnetic field, and wherein, for both classes of touchpads, a plurality of touchpads of the respective class are electrically coupled via a first portion of the connections;
   at least a second portion of the connections lead to at least one contact element outside of an area of surface having the touchpads at a first edge side, in that at least a first portion of the contact elements are coupled to in each case one contact element at a second edge side opposite the first edge side, via contact connection lines, which contact connection lines are provided by said strip conductors in a pattern, and in that at least some of the contact connection lines pass through the area of the surface having the touchpads, wherein a first distance (x') between a contact connection line passing through a gap and a touchpad is smaller than a second distance (y) between touchpads of the first class and touchpads of the second class, wherein the first distance (x') lies between 1 μm and 50 μm.

2. Multi-layer body according to claim 1, wherein at least a further portion of the contact connection lines are guided along a third edge side outside of the area of the surface having the touchpads.

3. Multi-layer body according to claim 2, wherein each contact connection fine of the further portion has a width (d) of between 150 μm and 400 μm and/or contact connection lines have a distance of between 1 μm and 50 μm from each other.

4. Multi-layer body according to claim 1 wherein at least one touchpad is divided into two parts which are separated by a gap, and in that the gap is passed through by the at least one strip conductor, by which at least one of the contact connection lines is provided.

5. Multi-layer body according to claim 1 wherein the second distance (y) lies between 100 μm and 500 μm.

6. Multi-layer body according to claim 4 wherein the contact connection line which passes through the gap has a width of between 100 μm and 1 mm.

7. Multi-layer body according to claim 1 wherein the touchpads are comb-shaped defined by fingers, wherein the fingers of the touchpads of the first class and fingers of the touchpads of the second class interlock, and wherein the touchpads of one class have a meandering base from which fingers protrude alternating in one direction and in the opposite direction, and wherein the meandering base is separated into two parts by a gap, wherein a contact connection line runs through the gap.

8. Multi-layer body according to claim 1 wherein the touchpads of the first class have the shape of quadrangles overlapping at one corner and the touchpads of the second class comprise a triangle shape with a tight angle which engages between the quadrangles, and wherein the overlapping quadrangles are separated into two parts by a gap, wherein a contact connection line runs through the gap.

9. Multi-layer body according to claim 1 wherein the strip conductors have a layer thickness of between 3 nm and 5 μm.

10. Multi-layer body according to claim 1 wherein the strip conductors are selected by at least one of the materials from the group of silver, copper, gold, aluminum, chromium, mixtures and/or alloys of the previously named materials, a conductive paste, polyaniline and polythiophene.

* * * * *